Sept. 20, 1971     L. P. PICKLER     3,605,537

INSULATION CUTTER

Filed Aug. 13, 1969     2 Sheets-Sheet 2

INVENTOR.
Lloyd P. Pickler

BY

*B. B. Olive*

ATTORNEY

United States Patent Office 3,605,537
Patented Sept. 20, 1971

3,605,537
INSULATION CUTTER
Lloyd P. Pickler, 634 McKee St., Albemarle, N.C. 28001
Filed Aug. 13, 1969, Ser. No. 849,687
Int. Cl. B26d 1/20, 19/00
U.S. Cl. 83—121                    1 Claim

ABSTRACT OF THE DISCLOSURE

An insulation cutter receives a supply roll of insulation material, unrolls and cuts the material to a preset width and length. Special handle arrangements allow the operator to perform the unrolling of the material and the cutting from either side of the machine and with minimum work aisle obstruction during periods of inactivity.

BACKGROUND OF THE INVENTION

(1) Field of the invention

The cutter of this invention relates broadly to machines having cut-off blades which are passed across a thick, fibrous material such as pipe insulation in order to obtain a length of material and also relates to adjustable bench type or table blades which provide a continuous width of material. Modern insulating practice for heating and cooling ducts is based on installing the insulation inside the ducts when the ducts are fabricated which avoids outside wrapping. The invention provides precut pieces for the described practice.

(2) Description of the prior art

The prior art is abundant with various types of complex, powered cut-off blades and powered table blades which provide a preset width and length material. An insulation cutter deemed relevant to the present invention is manufactured by The Lockformer Company, 4615 West Roosevelt Road, Chicago, Ill. 60650. However, none of the prior art cutters provide a relatively long but rotatable operating handle or other unrolling and cutting features hereafter described in more detail.

SUMMARY OF THE INVENTION

An insulation material cutter according to the invention provides a flat elevated work table substantially longer in length than in width and which has a blade which automatically slits to width the insulation material as it is pulled through the cutter until it reaches its preset length. The material is pulled by rollers which can be conveniently opertaed from either side of the machine. The table also mounts on a rail a movable cut-off blade. The cut-off blade is operated by a substantially long handle that facilitates reaching and operation from either side and when not in use the handle can be quickly rotated away from the work aisles and with the cut-off blade parked at one side. The slitting blade as well as the cut-off blade will accommodate various thicknesses of material.

The roll of supply material is rotatably mounted adjacent to and in front of the rollers. The upper, idler feed roller is resiliently loaded, i.e. by a spring, and presses down on the material from the supply roll. The lower, manually driven feed roller has an abrasive surface and has operating handles on each end. By turning the lower roller from either side of the machine, the material is drawn from the supply roll onto the flat table. With the slitting blade preset to the desired width, the insulation material being unrolled is forced past the slitting blade and is cut into the preset width. Once the material has reached its preset length, the operator then moves the cut-off blades across the material and the job is done. When the machine is idle the cut-off blade may be parked at either side of the machine and the cut-off blade handle rotated parallel to the table. This leaves the operating handle out of the work aisles normally found on either side of the machine and also leaves the cut-off blade out of the way of new material coming through the rollers.

An object of this invention is to provide an insulation cutter for insulation roll material which eliminates the tedious, time consuming hand operations in measuring and cutting of pieces of insulation material required for internal duct mounting.

A further object of this invention is to provide an insulation material cutter which virtually eliminates material waste due to measuring error or a miscue with the cutting knife and which provides every piece of material cut to substantially the exact size.

A further object of the invention is to provide a manually operable insulation material cutter which can be quickly set up in a shop or which can be taken to the job site and provide on the job cut material.

A still further object of the invention is to provide an insulation material cutter whose operating handles are arranged for operation from either side of the machine so as not to obstruct work aisles when not being used.

Other objects will appear from the drawings and description to follow.

DESCRIPTION OF THE DRAWINGS

FIG. 5 is an enlarged fragmentary elevation view of the slitting blade and blade guide of the invention.

FIG. 6 is a perspective view of the slitting blade and guide of FIG. 5.

FIG. 9 is a fragmentary elevation view of the feed roller tensioning device and in dashed lines possible positions of the upper roller according to material thickness.

DESCRIPTION OF THE INVENTION

Figure 1:
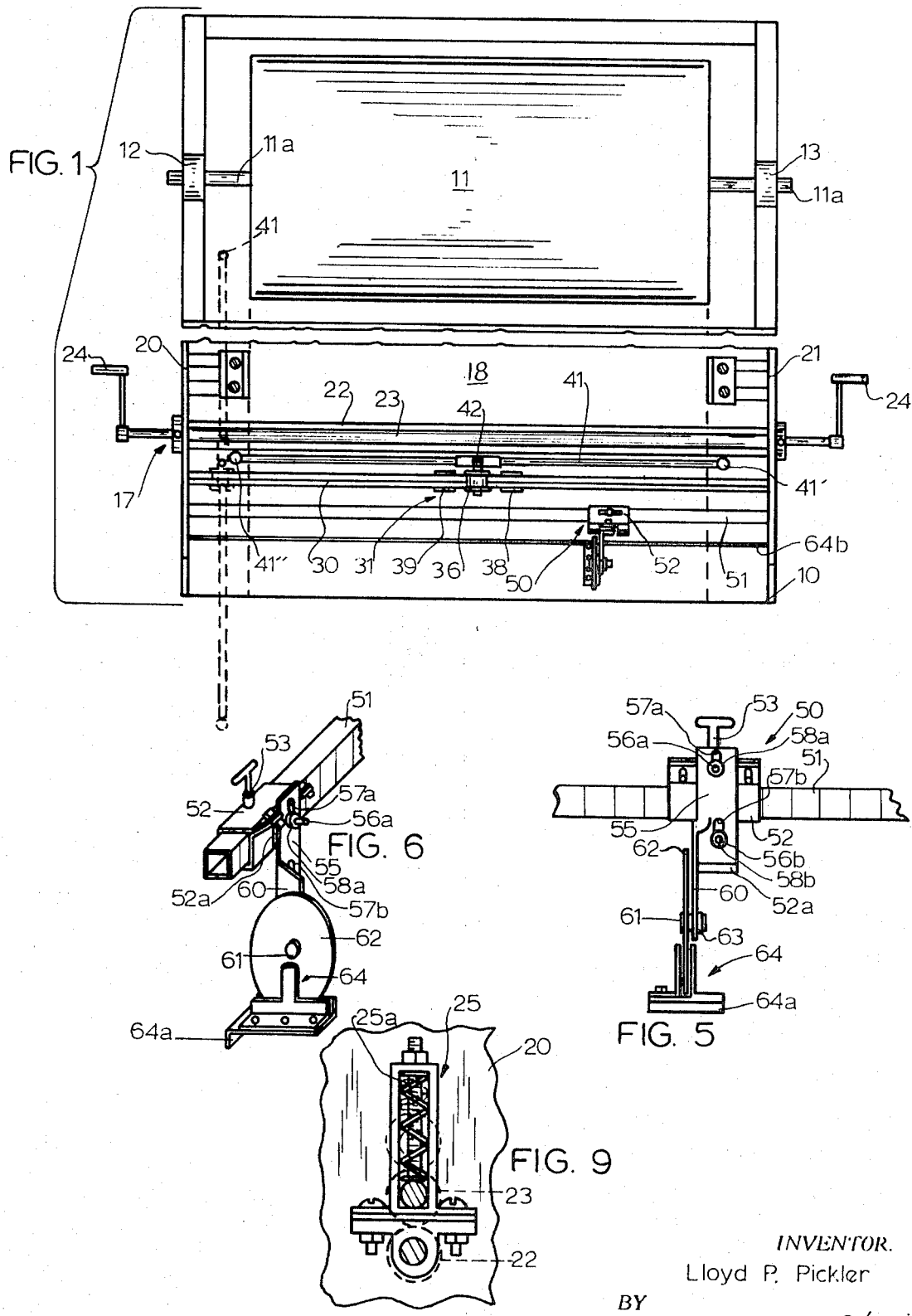
FIG. 1 is a fragmentary plan view of the insulation material cutter of the invention.
Figure 2:
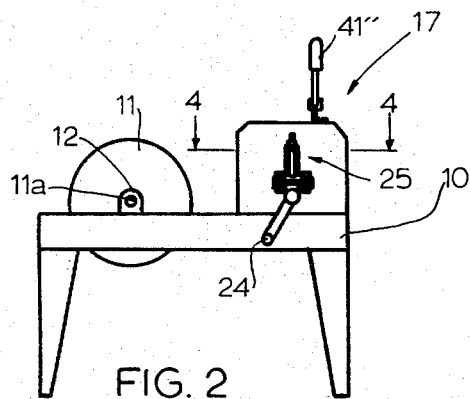
FIG. 2 is a side elevation view of the cutter of FIG. 1, the side not shown being identical to the side shown.
Figure 3:
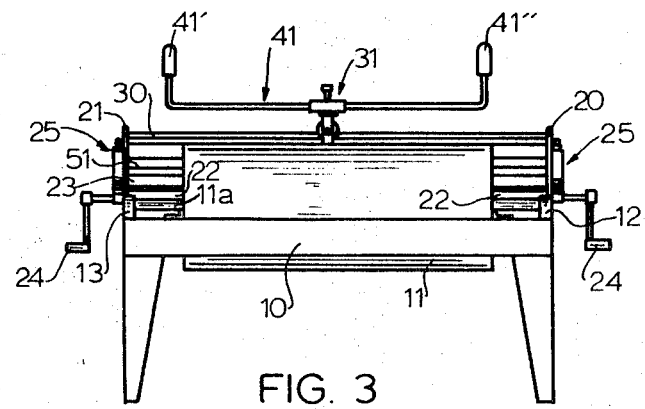
FIG. 3 is a front elevation view on a reduced scale of the cutter of FIG. 1.
Figure 4:
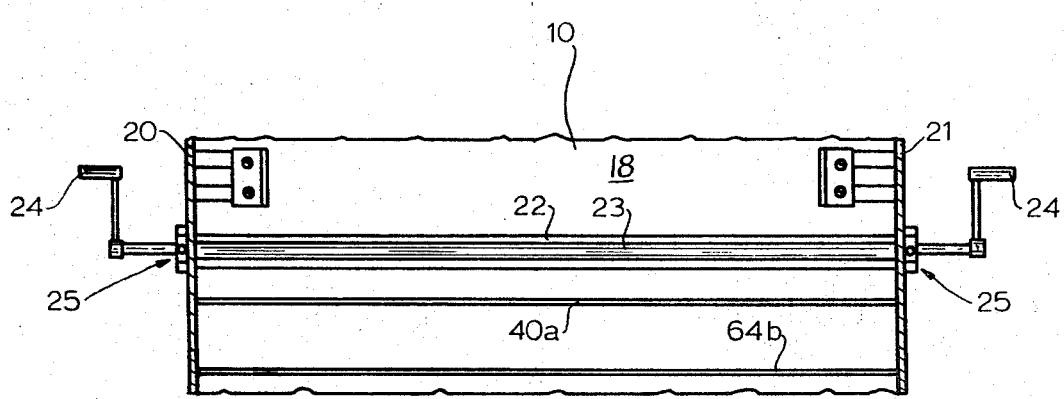
FIG. 4 is an enlarged fragmentary plan view taken substantially along line 4—4 of FIG. 2 with the slitting blade and the cut-off blade removed.

Referring particularly to FIGS. 1 through 5 for a general introduction to the insulation material cutter of the present invention, an elongated table frame 10 receives an insulation material roll 11 adjacent to one end of the work table frame 10. Material roll 11 is mounted rotatably on table frame 10 by a pair of rod receiving brackets 12, 13 which rotatably receive a rod 11A extending through the supply roll 11.

Mounted adjacent material supply roll 11 is the insulation cutter arrangement 17. Mounted opposite each other on the sides of table-frame 10 is a pair of upright metal side members 20, 21. Side members 20, 21 rotatably receive a lower manually driven roller 22 which extends across table-frame 10 and between members 20, 21. A second upper idler roller 23 is also mounted between sides 20, 21. Idler roller 23 has its ends passing through side members 20, 21. Side members 20, 21 each have mounted within a small rectangular case 25 respective springs 25A which exert a downward force against ends of the roller 23 and which forces the face of roller 23 towards the face of roller 22. Spring 25A is adjustable as to the amount of downward force to be exerted by the screw and nut arrangement shown in FIG. 9. Lower roller 22 is covered with an abrasive surface which provides a secure hold or pulling force upon the insulation material when it is fed between rollers 22 and 23. Any suitable abrasive cloth or paper may be secured to roller 23 and provide the desired abrasive action. A pair of hand cranks 24 are mounted on the ends of roller 22 which allows roller 22 to be rotated from either side of the machine and which will in turn pull insulation material from supply roll 11. The material passes between rollers 22, 23 with the help of the previously referred to abrasive surface, and is fed out onto the work surface 18 of work table-frame 10, aided by the abrasive or frictional surface.

Figure 7:
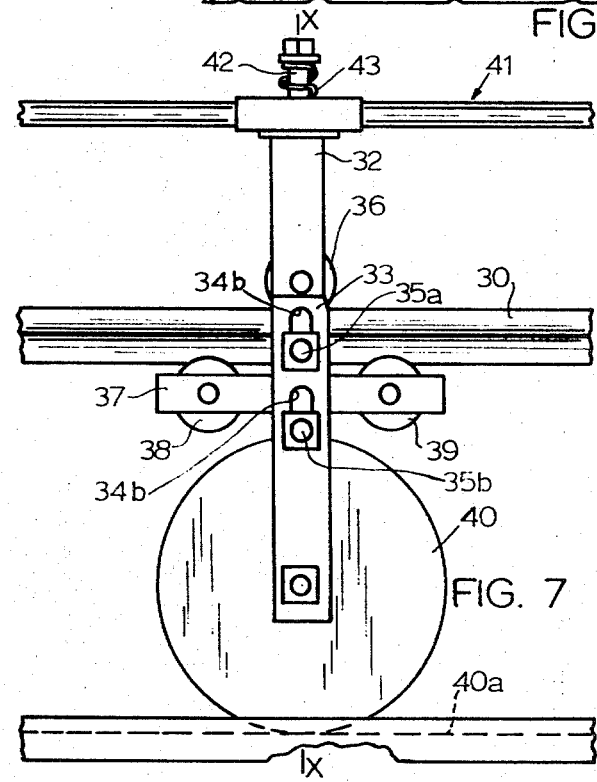
FIG. 7 is an enlarged fragmentary front elevation view of the cut-off blade.
Figure 8:
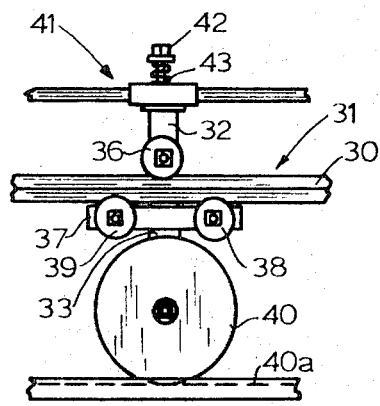
FIG. 8 is a reduced size fragmentary rear elevation view of the cut-off blade of FIG. 7.

A cross bar or rail 30 extends the width of table-frame 10 between side members 20, 21 and adjacent rollers 22, 23. A cut-off blade unit 31 is adjustably mounted on cross bar 30 and includes a pair of rectangular plate members 32, 33. Plate 33 has a pair of vertical slots 34a, 34b for receiving screws 35a, 35b which are mounted so that they pass through plate 32, through slots 34a, 34b respectively and mount tightening nuts as shown in FIG. 7. The slots thus provide a means of vertical adjustment. A roller or rail wheel 36 is rotatably mounted on plate 32 so that it rests on cross bar 30 and will ride thereon. Another rectangular plate 37 is rigidly mounted on plate 33 at a right angle thereto. A pair of rollers or rail wheels 38, 39 are rotatably mounted on opposed ends of plate 37 and are adapted to ride along against the underside of wheel rail or bar 30. Rollers 36, 38 and 39 work together to hold the cut-off blade unit 31 on cross bar 30 and also provides for its lateral movement across the width of table-frame 10 on cross bar 30. A cut-off blade 40 is rotatably mounted on the blade mount provided by the lower end of member 33. Blade 40 rides across the width of table-frame 10 and is guided by a groove 40A.

At the upper end of member 32 is mounted a relatively long double handle 41 having handle grips 41', 41". Handle 41 is rotatable by means of a screw arrangement 42 passing through handle 41. A spring 43 is mounted on screw 42 and exerts a force downward against handle 41. Handle 41 is held in position by means of spring 43 but handle 41 can be rotated about screw 42 so that it is out of the way of the table-frame 10 when the cutting operations are shut down, as shown in dashed lines in FIG. 1. It will also be noticed in FIGS. 1 and 3 that the span of handle 41, i.e. the distance between handle grips 41', 41" roughly equals the width of insulation roll 11 which facilitates reaching across the table. However, as indicated by the dashed line position of handle 41 in FIG. 1, handle 41 can be quickly rotated out of the work aisles with cut-off blade 40 left in position on either side of the machine which frees the center of the machine for movement of new material in a later operation. As indicated by the reference line X—X in FIG. 7 and from FIG. 1, it will be noted that the axis of rotation of handle 41 is slightly laterally offset from the plane of blade 40 but generally bisects blade 40 which facilitates the handle operation described.

The slitting blade arrangement 50 is slidably mounted on a cross bar or mounting rod 51 which also extends across table 10 adjacent cross bar 30 and adjacent rollers 22, 23. While shown spaced apart for clarity in FIG. 1, the slitting blade arrangement 50 and cut-off blade unit 31 are in practice mounted as close as possible to avoid buckling of material. A rectangular sleeve 52 has cross bar 51 passing through sleeve 52. Sleeve 52 has a thumb screw 53 in the top which can be tightened down against bar 51 to prevent lateral movement. A plate member 55 is rigidly secured to sleeve 52. Sleeve 52 has a plate 52a made integral therewith and a pair of screws 56a, 56b made integral with plate 52a at right angles thereto. A second plate member 55 is received by means of slots 57a, 57b. Screws 56a, 56b then have nuts 58a, 58b respectively which can be tightened against plate 55 to prevent vertical movement.

A second plate member 60 is made integral with plate 55 and extends downward at right angles to the side of plate 55. Plate 60 has a hole at its lower end through which passes a bolt 61. Bolt 61 provides a blade mount and receives a slitting blade 62 which is held by bolt 61 and a nut 63. While not shown, it should be understood that cross bar 51 has marked off thereon inch marks for ease in setting the slitting blade arrangement 50 for the desired width of insulation material to be cut. A U-shaped blade guide 64 receives blade 62 in a non-engaging relation. Blade guide 64 has an angle 64a which rides in a groove 64b in work surface 18 and which extends across table 10 and guide 64 slides with slitting blade arrangement 50 when thumb screw 53 is loosened.

Once the slitting blade 62 has been set to the desired width material to be cut, the operator starts the supply roll material through the cutter. The supply roll material is manually fed in between rollers 22, 23 and then either of the hand cranks 24 is turned to continue feeding of the material. As the material reaches slitting blade 62, the blade is rotated by the forward push of the material and as it is slitted the respective work piece and waste slit lengths pass on either side of guide 64. The material feeds past and on either side of slitting blade 62, which is of course maintained extremely sharp, and is slit into the desired width and is fed past slitting blade 62 until the desired length of the material has been cut. Then the cut-off blade 40 is pulled across the material by means of the operator holding and pulling on one of the handles 41', 41" of the substantially long handle 41. Once cutting has been completed, handle 41 is rotated out of the way as previously explained and blade 40 is left on one side or the other of the machine ready to resume cutting and is allowed to remain there until a further cut-off step is needed. It will be especially noticed that when the cut-off blade 40 is parked at one side and the handle 41 is rotated to the table not only are the aisles free but the central area of the table is free for movement of new material. Prior art cutters do not provide a convenient way to park the cut-off blade to one side and to rotate the cut-off blade handle. Thus, the operator in the conventional cutter has to park the cut-off blade and the generally short, fixed handle in the middle of the table and has to move the cut-off blade to the side before starting new material.

I claim:
1. A cutting apparatus for cutting thick, fibrous insulation type material fed from a substantially long continuous roll into pieces of predetermined and variable width and length comprising:
 (a) a work table having a supporting frame and on one end a table surface having a groove extending across said surface;
 (b) a roll support extending across the end of said table opposite said table surface and rotatably mounting a supply roll of said material;
 (c) a pair of upper and lower opposed rollers mounted adjacent said roll support and proximate said table surface and extending across said table, the upper of said rollers being an idler roller and being adjustably spring loaded towards said lower roller, the lower of said rollers having a frictional surface for gripping said material and handle means on each end thereof for operating said lower roller from either side of said table, said rollers being adapted to withdraw a predetermined length of said material from said roll and force such length onto said table surface;
 (d) slitting blade means including a mounting rod extending across and above said table surface and adjacent said rollers, a bracket adjustably secured to said mounting rod and providing below said rod a vertically and horizontally adjustable slitting blade mount, a slitting blade rotatably positioned on said slitting blade mount at a lateral position corresponding to a preset width and material thickness and adapted to slit said thickness to such preset width as said material is pushed by said rollers against said slitting blade, the spacing between said rollers and slitting blade being sufficiently small to prevent buckling of said material;

(e) slitting blade guide means positioned on said surface below said slitting blade and having a base portion and a U-shaped guide mounted thereon and adapted to receive a lower portion of said slitting blade in a non-engaging relation, said base portion having a downwardly turned flange adapted to loosely engage and slide in said table surface groove;

(f) cut-off blade means positioned between said rollers and slitting blade means including a support rail extending across said table adjacent said rollers, a wheel bracket arrangement providing a set of wheels adapted to ride said rail and a bracket supported by said wheels providing a vertically adjustable cut-off blade mount, and a cut-off blade rotatably mounted on said cut-off blade mount, said cut-off blade means being adapted when adjusted to a vertical position corresponding to said material thickness and pushed across said table to cut said material to a preset length corresponding to the length of said material drawn on the said table past said rail; and (g) a horizontal handle bar mounted rotatably above and on said wheel bracket arrangement and having integral therewith two upright hand grips at the ends thereof said handle bar being of substantially the same length as the width of said material being cut, said handle having a central vertical axis of rotation substantially coinciding with the central vertical axis of said cut-off blade and spring means adapted to maintain said bar in a selected position, said handle bar thus being adapted when positioned parallel to said rail and in conjunction with said roller handles to allow the operator to operate said rollers and move said cut-off blade across said material from either side of said table and when not in use said handle being adapted to being rotated and releasably held by said spring means in a horizontal plane to a position substantially perpendicular to said rail while said cut-off blade remains positioned at one side of said table thereby leaving aisle space on both sides of said table free of the obstruction of said handle and the central area of said table free of the obstruction of said cut-off blade

References Cited
UNITED STATES PATENTS

| | | | |
|---|---|---|---|
| 633,321 | 9/1899 | Kitchen | 83—408 |
| 3,296,911 | 1/1967 | McLane | 83—408 |

JAMES M. MEISTER, Primary Examiner

U.S. Cl. X.R.

83—408, 433, 485, 564, 578, 614